(12) United States Patent
Chan

(10) Patent No.: US 11,701,867 B2
(45) Date of Patent: Jul. 18, 2023

(54) METHOD OF MANUFACTURING A TIMBER COMPOSITE, THE TIMBER COMPOSITE OBTAINED AND DECORATIVE PANELS COMPRISING SUCH TIMBER COMPOSITE

(71) Applicant: FLOORING INDUSTRIES LIMITED, SARL, Bertrange (LU)

(72) Inventor: Peter Chan, Smithfield (AU)

(73) Assignee: Flooring Industries Limited, SARL, Bertrange (LU)

( * ) Notice: Subject to any disclaimer, the term of this patent is extended or adjusted under 35 U.S.C. 154(b) by 0 days.

(21) Appl. No.: 17/693,750

(22) Filed: Mar. 14, 2022

(65) Prior Publication Data

US 2022/0194060 A1    Jun. 23, 2022

Related U.S. Application Data

(63) Continuation of application No. 16/724,718, filed on Dec. 23, 2019, now Pat. No. 11,338,557, which is a
(Continued)

(30) Foreign Application Priority Data

| Apr. 11, 2014 | (CN) | 201410146739.3 |
| Sep. 12, 2014 | (NZ) | 631133 |
| Mar. 19, 2015 | (AU) | 2015201455 |

(51) Int. Cl.
*B32B 21/04* (2006.01)
*B27N 7/00* (2006.01)
(Continued)

(52) U.S. Cl.
CPC ............. *B32B 21/042* (2013.01); *B27N 3/00* (2013.01); *B27N 7/005* (2013.01); *B32B 7/12* (2013.01);
(Continued)

(58) Field of Classification Search
None
See application file for complete search history.

(56) References Cited

U.S. PATENT DOCUMENTS

| 2,412,534 A | 12/1946 | Boardman |
| 2,653,890 A | 9/1953 | Dosker |

(Continued)

FOREIGN PATENT DOCUMENTS

| AU | 2011 236087 | 5/2013 |
| AU | 2011236087 A1 * | 5/2013 |

(Continued)

OTHER PUBLICATIONS

First Chinese Office Action and First Search for Chinese Application No. 201410146739.3 dated Mar. 27, 2015.
(Continued)

*Primary Examiner* — Scott R. Walshon
(74) *Attorney, Agent, or Firm* — KDW Firm PLLC

(57) ABSTRACT

A decorative panel including a substrate material and a decorative top layer, wherein the decorative top layer includes at least one timber layer with a wood structure, wherein the timber layer is a compressed timber layer with naturally occurring vessels throughout a thickness of the wood structure, the vessels being collapsed.

12 Claims, 7 Drawing Sheets

Related U.S. Application Data continuation of application No. 16/262,395, filed on Jan. 30, 2019, now Pat. No. 10,538,064, which is a continuation of application No. 15/303,467, filed as application No. PCT/AU2015/000164 on Mar. 20, 2015, now Pat. No. 10,213,989.

(51) Int. Cl.
| | |
|---|---|
| B32B 7/12 | (2006.01) |
| B32B 21/14 | (2006.01) |
| E04F 15/04 | (2006.01) |
| E04F 15/02 | (2006.01) |
| B27N 3/00 | (2006.01) |
| B32B 21/08 | (2006.01) |
| B32B 37/06 | (2006.01) |
| B32B 37/10 | (2006.01) |
| B32B 37/12 | (2006.01) |
| B32B 38/00 | (2006.01) |
| B32B 37/08 | (2006.01) |
| B32B 38/06 | (2006.01) |
| B32B 37/26 | (2006.01) |
| B32B 38/16 | (2006.01) |

(52) U.S. Cl.
CPC ............. *B32B 21/08* (2013.01); *B32B 21/14* (2013.01); *B32B 37/06* (2013.01); *B32B 37/10* (2013.01); *B32B 37/12* (2013.01); *B32B 38/0004* (2013.01); *E04F 15/045* (2013.01); *E04F 15/046* (2013.01); *B32B 37/08* (2013.01); *B32B 37/1284* (2013.01); *B32B 38/06* (2013.01); *B32B 2037/1253* (2013.01); *B32B 2037/262* (2013.01); *B32B 2038/166* (2013.01); *B32B 2255/08* (2013.01); *B32B 2255/26* (2013.01); *B32B 2307/718* (2013.01); *B32B 2309/025* (2013.01); *B32B 2309/04* (2013.01); *B32B 2309/105* (2013.01); *B32B 2317/16* (2013.01); *B32B 2419/04* (2013.01); *B32B 2451/00* (2013.01); *B32B 2471/00* (2013.01); *E04F 15/02038* (2013.01); *E04F 2201/0146* (2013.01); *E04F 2201/0153* (2013.01); *E04F 2201/023* (2013.01)

(56) References Cited

U.S. PATENT DOCUMENTS

| | | | |
|---|---|---|---|
| 4,031,276 | A | 6/1977 | Nakamura et al. |
| 5,286,545 | A | 2/1994 | Simmons, Jr. |
| 6,162,312 | A | 12/2000 | Abney |
| 6,402,869 | B1 | 6/2002 | Von Haas |
| 7,473,457 | B2 | 1/2009 | Han |
| 7,669,879 | B2 | 3/2010 | Dykema |
| 7,981,233 | B2 | 7/2011 | Wellwood et al. |
| 8,268,430 | B2 | 9/2012 | Johnson et al. |
| 10,213,989 | B2 | 2/2019 | Chan |
| 10,538,064 | B2 | 1/2020 | Chan |
| 2010/0199831 | A1 | 8/2010 | Hiraku et al. |
| 2011/0220271 | A1 | 9/2011 | Fyie et al. |
| 2017/0036424 | A1 | 2/2017 | Chan |
| 2019/0160793 | A1 | 5/2019 | Chan |
| 2020/0139682 | A1 | 5/2020 | Chan |

FOREIGN PATENT DOCUMENTS

| | | |
|---|---|---|
| CN | 1383997 | 12/2002 |
| CN | 1425837 | 6/2003 |
| CN | 1743155 | 3/2006 |
| CN | 101020322 | 8/2007 |
| CN | 101314228 | 12/2008 |
| CN | 101379254 | 3/2009 |
| CN | 101508123 | 8/2009 |
| CN | 201597084 | 10/2010 |
| CN | 102179842 | 9/2011 |
| CN | 102848433 | 1/2013 |
| CN | 103231427 | 8/2013 |
| CN | 103522384 | 1/2014 |
| CN | 103878834 B | 5/2016 |
| CN | 106660356 A | 5/2017 |
| EP | 1026341 | 8/2000 |
| EP | 3129228 A4 | 12/2017 |
| GB | 807090 | 1/1959 |
| GB | 2050941 | 1/1981 |
| JP | 2000167805 | 6/2000 |
| KR | 1020100111849 | 10/2010 |
| NZ | 539188 | 2/2007 |
| WO | WO 9747834 | 12/1997 |
| WO | WO 98049248 | 11/1998 |
| WO | WO 2005/060507 | 7/2005 |
| WO | WO 2007/091614 A1 | 8/2007 |
| WO | WO 2010/032080 | 3/2010 |
| WO | WO 2010/122156 | 10/2010 |
| WO | WO 2014/1096974 | 7/2014 |
| WO | WO 2015/154124 A1 | 10/2015 |

OTHER PUBLICATIONS

International Search Report for Application No. PCT/AU2015/000164 dated Jun. 9, 2015.
Written Opinion for Application No. PCT/AU2015/000164 dated Jun. 9, 2015.
Second Chinese Office Action and Supplementary Search for Chinese Application No. 201410146739.3 dated Oct. 8, 2015.
Third Chinese Office Action for Chinese Application No. 201410146739.3 dated Feb. 3, 2016.
Extended European Search Report for European Application No. 15776792.2 dated Nov. 27, 2017.
First Search for Chinese Application No. 201580020375.7 dated Mar. 27, 2018; retrieved from Global Dossier on Jan. 10, 2019.
Non-Final Office Action for U.S. Appl. No. 15/303,467 dated May 2, 2018.
Notice of Allowance for U.S. Appl. No. 15/303,467 dated Oct. 5, 2018.
Chinese Office Action for Chinese Application No. 201580020375.7 dated Oct. 24, 2018.
Non-Final Office Action for U.S. Appl. No. 16/262,395 dated Mar. 21, 2019.
Notice of Allowance and Interview Summary for U.S. Appl. No. 16/262,395 dated Sep. 11, 2019.
European Office Action for Application No. 15776792.2 dated Apr. 17, 2020.
European Office Action for Application No. 15776792.2 dated Aug. 31, 2020.
European Office Action for Application No. 15776792.2 dated Mar. 24, 2021.
Non-Final Office Action for U.S. Appl. No. 16/724,718 dated Aug. 25, 2021.
Notice of Allowance for U.S. Appl. No. 16/724,718 dated Jan. 21, 2022.
Zhang Guohui, Construction and Decorative Material Engineering, China Building Materials Press, Jan. 2012, p. 61.

\* cited by examiner

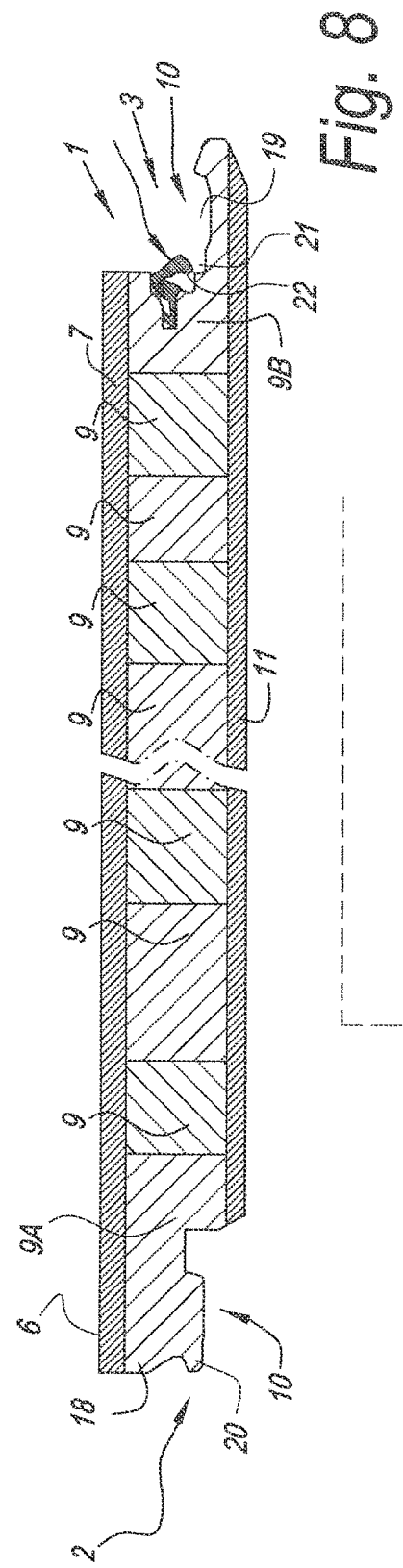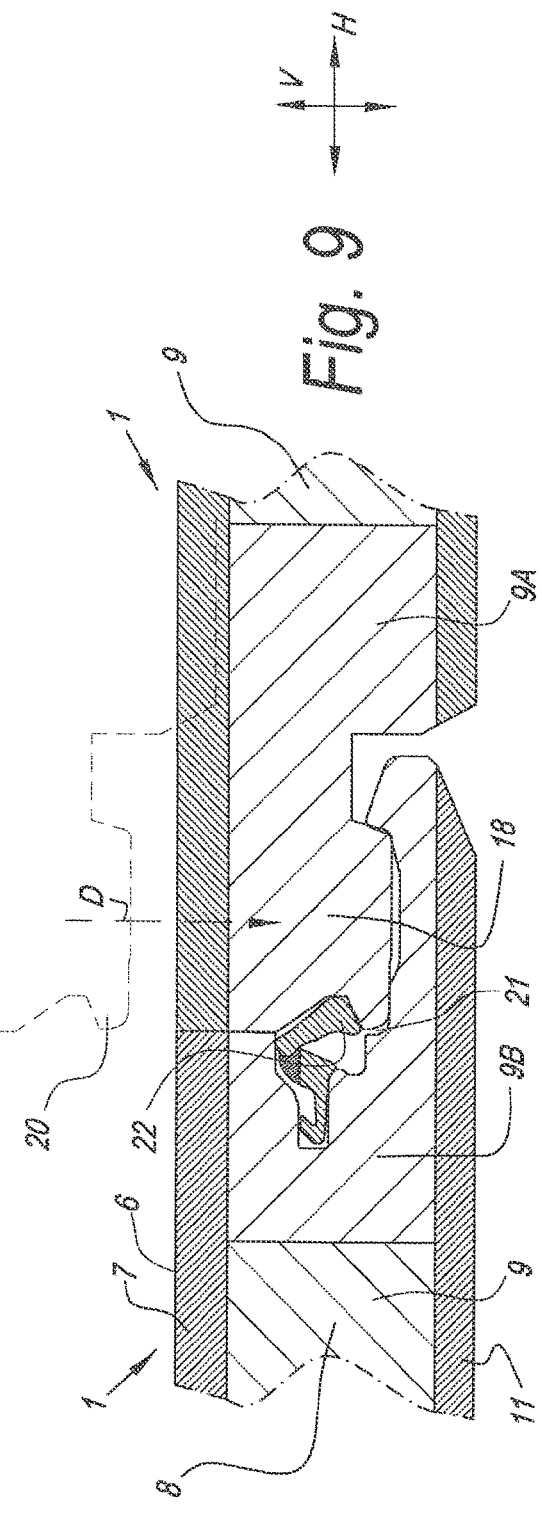

METHOD OF MANUFACTURING A TIMBER COMPOSITE, THE TIMBER COMPOSITE OBTAINED AND DECORATIVE PANELS COMPRISING SUCH TIMBER COMPOSITE

CROSS-REFERENCE TO RELATED APPLICATIONS

This patent application claims priority to co-pending U.S. patent application Ser. No. 16/724,718, filed Dec. 23, 2019, which claimed priority to Ser. No. 16/262,395, filed Jan. 30, 2019, which claimed priority to Ser. No. 15/303,467, filed Oct. 11, 2016, which claimed priority to PCT/AU2015/000164 filed Mar. 20, 2015, which claimed priority to AU 2015201455 filed Mar. 19, 2015, which claimed priority to NZ 631133 filed Sep. 12, 2014, and CN 201410146739.3 filed Apr. 11, 2014, the entire content of which is incorporated by reference herein.

BACKGROUND OF THE INVENTION

1. Field of the Invention

Disclosed herein is a timber composite, a method of manufacturing a timber composite and decorative panels comprising such timber composite. In particular, the timber composite may be suitable for, but not limited to, flooring or other surface applications.

2. Related Art

Composite timber is used as a construction and/or decorative material. However, known timber composite has low density and low strength, which can limit the viable applications for such timber.

Plywood is one example of a composite timber that is used as a construction material. To form plywood, several layers of wood (e.g. having a thickness of 1.6 mm to 2 mm) are stacked such that the direction of the grains of the layers alternates. Adhesive is applied to the surfaces of the layers of wood such that they are bonded to one another. The quality or veneer grade may change from high quality, or veneer grade A for the outermost layers or just for the top layer, to low quality, or veneer grade C or less for the internal layers and possibly the bottommost layer. Floor panels manufactured from such plywood panels are disclosed in WO 2005/060507. In such floor panels the upper decorative surface is formed from a thick veneer of a high quality grade. The mechanical properties, such as impact and scratch resistance, of the upper surface depend on the wood species of this veneer.

For decorative reasons, some timber is produced with an embossed effect, where the surface of the timber is textured according to the grain of the timber. Such an effect is produced by scraping off portions of the surface of the timber that are low density, either manually, e.g. with a steel brush, or by a machine. This results in the surface of the timber having a rugged "wire-drawn" or embossed appearance corresponding to the grain of the timber. The timber used in such a process is low density, because only low density timber (e.g. pine, elm, oak, etc.) is suitable for scraping. However, such timber, due to its low density, may be easily damaged (e.g. forming a concave shape) or may wear quickly from daily usage, and thus may not be suitable for long term applications, e.g. in panels for a floor covering.

From WO 2010/032080 it is known to manufacture a wooden panel for use as a floor board by gluing and pressing scrap wooden strips. The obtained floor boards possess a high hardness. The resulting decorative aspect of the wood grain pattern is unnatural.

WO 2014/109697, which was not published at the earliest priority date of the present application, discloses a building panel comprising an MDF/HDF core with an applied thereon surface layer comprised of veneer and thermosetting resin. The building panel may amongst others be used as a floor panel or a furniture panel. At the bottom of the panel a balancing layer of thermosetting resin is applied. The above references to the background art do not constitute an admission that the art forms part of the common general knowledge of a person of ordinary skill in the art. The above references are also not intended to limit the application of the methods or timber composite as disclosed herein.

SUMMARY OF THE DISCLOSURE

Disclosed herein is a method of manufacturing a timber composite, a timber composite and a decorative panel comprising such timber composite. The method comprises the steps of applying adhesive to one or more timber layers, applying pressure to the one or more timber layers, and heating the timber layers, such that the adhesive penetrates into the one or more timber layers and cures to form the timber composite. The application of pressure and heat is preferably done at least partly simultaneously.

It is clear that when more than one timber layer is treated in accordance with the invention, preferably a laminated assembly of these timber layers is attained, wherein the aforesaid adhesive not only penetrates the timber layers but also attaches adjacent superposed timber layers to each other.

Preferably the adhesive is a thermosetting adhesive. Preferably the adhesive is based on melamineformaldehyde, ureumformaldehyde, melamine-ureumformaldehyde or phenolformaldehyde. According to variants such adhesives as polymeric MDI (Methylene Diphenyl di-Isocyanate) may be used or other formaldehyde free adhesives, e.g. based on starch, proteins or carbohydrates such as sugar. Due to the use of a thermosetting adhesive curing may be obtained in a heated press operation. In such case any compression obtained in the timber layers may at least partially become permanent due to the adhesive curing in the compressed state of the timber layers. It is however clear that some limited amount of spring-back may occur upon release of the pressure.

The penetration of the adhesive into the timber layers differs, for example, from plywood whereby the adhesive remains on the surface of the plywood layers. It has been found that, using a suitable adhesive, then applying an appropriate amount of heat and pressure to the timber layers can allow the adhesive to penetrate into and throughout the fibers of the timber layers, Curing the resultant penetrated adhesive within the timber layers can result in a denser and stronger composite timber product, e.g. as compared to the original timber layers.

The penetration of the adhesive into the one or more timber layers may be such that it enters the available hollow spaces or voids in the wood structure, such as vessels. Upon pressing and heating the hollow spaces collapse and their opposing walls are glued together permanently by the cured adhesive.

The method of the invention may lead to a permanent density increase of the thus treated one or more timber layers. The increase in density may be due to several factors. One factor being an increase due to the weight of the impregnated adhesive and another factor being the compression of the timber itself, for example because of the permanent collapse of hollow spaces in the wood structure. Preferably a density increase of at least 20 percent is reached, and even better at least 50 percent. For example a softwood species with a specific gravity of 0.47 (at 12% moisture), e.g. Douglas-fir, may be upgraded by the method of the invention to a specific gravity of about 0.60.

An increase in density obtained with the method of the invention may lead to an increase of hardness of the treated one or more timber layers.

In one embodiment the penetration of the adhesive may be such that it is distributed generally evenly throughout the interstices and pores of the fibers of the one or more timber layers.

In one embodiment the adhesive may be applied to a plurality of timber layers, and the method may further comprise arranging the plurality of timber layers in a stack. This stack may then be fed in a heated press, for compressing and consolidating the plurality of timber layers. Preferably such stack exclusively comprises timber layers and adhesive. In accordance with a variant, such stack may comprise other layers as well, such as reinforcement layers, for example glass fiber layers, either woven or non-woven. The incorporation of a glass fiber layer as an outermost layer or as an internal layer may lead to additional impact resistance, and may counteract a warping tendency of the resulting timber composite. In accordance with another variant such stack may comprise a board material, such as a chipboard or an MDF/HDF board, as a lowermost layer or internal layer.

In one embodiment the method may further comprise the step of cutting one or more timber pieces to form the plurality of timber layers. Preferably the plurality of timber layers comprised in one stack to be pressed is cut from the same piece of timber.

In one embodiment the timber layers may be arranged in the stack in their original order in the timber piece from which they are cut such that a natural grain appearance of the timber piece is maintained. This may be desirable, for example, when the timber composite is to be used for decorative purposes, i.e. where the appearance of the grain is important to the use of the timber composite. The latter being the case in flooring or furniture applications. Whenever excessive wear leads to the uppermost timber layer being worn out locally, the underlying timber layer shows up at this spot with the same or very similar wood grain. A naturally wearing surface is obtained.

In accordance with a variant of the above embodiment a timber composite may comprise timber layers obtained from several timber pieces, wherein at one or both flat surfaces of the timber composite one or more timber layers of a first, preferably high, quality are arranged, while centrally in the timber composite other, preferably lower quality timber layers are arranged. Here below some possibilities are listed for the combination of outer and inner timber layers, preferably respectively high and low quality timber layers.

According to a first possibility the outer or high quality timber layers consist of timber layers of veneer grade A or better, and the inner or low quality timber layers consists of timber layers of veneer grade quality lower than A, e.g. B or C.

According to a second possibility the outer or high quality timber layers consist of timber layers of hardwood, while the inner or low quality timber layers consist of timber layers of softwood. The hardwood may e.g. be oak, gumtree, birch or beech. The softwood may be pine.

According to a third possibility the outer or high quality timber layers consist of timber layers with a specific gravity at 12% humidity of at least 0.55 or of at least 0.5 ovendry weight, while the inner or low quality timber layers consist of timber layers with a specific gravity of 0.5 or lower at 12% humidity, or of 0.45 or lower ovendry weight.

According to a fourth possibility the outer or high quality timber layers consist of timber layers that are sliced or saw cut from the timber piece, while the inner or low quality timber layers consists of timber layers that have been rotary peeled from the timber piece.

According to a fifth possibility the outer timber layers consist of stained timber layers, while the inner timber layers consists of unstained timber layers.

According to a sixth possibility the outer timber layers consist of timber layers with a thickness below 0.7 mm. Such thickness may ensure good penetration of the adhesive and a resultant raise of the mechanical properties of interest, such as indentation resistance. The inner layers may have any thickness, e.g. between 0.2 and 1 mm, even if the adhesive would no longer be able to fully penetrate it.

According to a seventh possibility the outer timber layer, at least one of the top and bottom layers, of the timber composite is penetrated with a melamine-based adhesive, while the central layers are penetrated with another, preferably thermosetting, adhesive. For the other adhesive use could be made of a phenol-based adhesive. The latter adhesive is more economic and possesses an excellent moisture resistance, but has the disadvantage that it is not transparent and hence colors the impregnated timber layers, while melamine is transparent. Preferably the top and/or bottom layers are free from phenol adhesives, such as phenolformaldehyde.

Preferably at least two of the aforementioned high quality timber layers are present at at least one of the flat surfaces of the timber composite. In this way a naturally wearing surface can be obtained e.g. in flooring, to a satisfactory extent. The remainder of the timber layers in the timber composite may then be of lower quality.

In one embodiment the cutting may be one of rotary peeling, slicing or saw cutting. Preferably slicing or saw cutting is used, and most preferably saw cutting.

In one embodiment each timber layer may have a thickness of 0.2 mm to 1 mm, wherein a thickness between 0.4 and 0.7 is preferred from the point of view of penetration of the adhesive.

In one embodiment the timber may have a moisture content of 8% to 12% prior to the application of pressure and heat. The timber may be dried prior to performing the method in order to arrive at this moisture content.

In one embodiment the adhesive applied to the timber layers may be of a type that cures at high temperatures, e.g. at a temperature above 120° C. In this respect, preferably the adhesive does not cure until it has fully penetrated the timber layers. Therefore, the adhesive preferably comprises a flow and/or levelling agent such as polyglycolether, epsilon-caprolactam and butandiol.

In one embodiment the adhesive may be applied to one or both sides of the timber layer or of each timber layer. The adhesive may be a melamine resin or based on melamine resin, such as a melamine formaldehyde resin; and or a resin based on one or more of polyolefins, polyamides, polyurethane, polyvinyl acetal, urea, asphalt, etc. In the case the adhesive comprises melamine formaldehyde, such adhesive may comprise one or more of the following properties:

the adhesive comprises a catalyst, such as NaOH and/or thiosulphate, preferably in an amount of less than 20 parts per 100 parts melamine;

the adhesive comprises urea, preferably in an amount of less than 20 parts per 100 parts of melamine;

the adhesive has a melamine to formaldehyde ratio of between 3:1 to 6:1, preferably about 5:1;

the adhesive comprises a plasticizer, such as polyvinyalcohol and/or polyurethane.

In one embodiment the pressure applied to the timber may be between 2000 kPa and 10,000 kPa.

In one embodiment the timber may be heated to a maximum temperature of between 100° C. and 200° C.

Preferably the application of pressure and heat is at least partially simultaneously, such that the adhesive may cure to at least some extent under pressure. In this way a compressed or densified state of the one or more timber layers can at least partly be maintained permanently.

In one embodiment the timber may be gradually heated to allow the adhesive to fully penetrate the one or more timber layers. For example, in some cases when the timber is heated too quickly the adhesive may cure prior to fully penetrating the timber layers.

In one embodiment, when the step of heating the timber is performed, the temperature of the timber may be increased from room temperature to a maximum temperature (e.g. being in the range of 50° C. to 100° C.) gradually over a period of 20 to 60 minutes. Again, the gradual increase in temperature may allow the adhesive to fully penetrate and/or be distributed generally evenly throughout the one or more timber layers, thereby penetrating the interstices and pores of the fibers.

In one embodiment the method may further comprise the steps of cooling the timber and releasing the pressure. In one embodiment the pressure may only be released once the temperature of the timber has returned to approximately room temperature. Delaying the release of the pressure may better allow the adhesive to fully cure.

In one embodiment the method may further comprise the step of positioning a spacer between two timber layers. When a spacer is located between two timber layers, it may help to reduce or inhibit the escape of moisture from the timber layers. When moisture is trapped in the timber, the timber may soften, which in turn facilitates compression of the timber. It may also provide varying compression or shrinkage of the spring wood and summer wood in the timber. When the adhesive cures it may hold the timber in this shape such that the resulting timber composite has raised portions of summer wood, i.e. such that the texture of the grain structure is enhanced.

In one embodiment the adhesive may be applied to a plurality of timber layers. The spacer may be positioned such that a stack of timber layers is formed on either side of the spacer. Each stack of layers may be cut from a different timber piece.

In one embodiment each stack of layers on either side of the spacer may be arranged in the original order from which they are produced from the timber piece(s), such that a natural grain of each stack may be maintained. This may be desirable in decorative applications where the timber composite will be visibly used (e.g. flooring). Preferably not only the original order, but also the original mutual orientation of the timber layers is maintained. It is of course possible that two timber layers that are adjacent in a stack were not positioned adjacently in the original timber piece, but were rather separated by an intermediate timber layer that is missing in the stack, e.g. because this timber layer was wasted during the manufacturing.

In one embodiment the spacer may be a sheet of cardboard, plastic or soft metal.

In one embodiment the method may further comprise the step of applying a stain to the one or more timber layers, preferably prior to applying an adhesive to the one or more timber layers. The stain may be applied so as to penetrate into and be distributed evenly within the one or more timber layers. In accordance with a variant the stain may be applied at the same time as the application of the adhesive. The stain may be mixed into the adhesive before application thereof, or the stain may be applied to a surface of the timber layer immediately before or after the application of the adhesive.

When the timber layers are, for example, thinly cut the stain may more easily penetrate into and be evenly distributed throughout each timber layer, including into pores and interstices between fibers (e.g. compared to a block or panel of timber). In this way, when the timber layers are formed into a timber composite, the timber composite has a coloring, preferably an even coloring, (i.e. stain) throughout its interior. This even coloring (or staining) throughout the timber composite may not be achievable, or may be difficult to achieve, with a traditional block or panel of timber where the stain can only be applied to the outer surface of the block of timber, in which case the stain may not or not fully penetrate into its interior.

An even distribution of stain or a distribution of stain throughout the timber composite may be desirable, for example, when the timber composite is used in applications in which it may be subject to wear. Without a uniform distribution of stain or without a sufficiently deep distribution of stain (i.e. when stain does not penetrate into the timber), wearing of the surface of the timber will cause the color of the timber to fade (i.e. because the areas that are more deeply stained on the surface are worn away). On the other hand, by staining the layers of timber composite such that the stain is distributed throughout the timber, preferably generally uniformly, removal of the surface of the timber composite (e.g. through wear) may not affect the appearance of the timber composite.

Also disclosed herein is a method of manufacturing a timber composite. The method comprises the steps of applying adhesive to a plurality of timber layers, arranging the timber layers in a stack, and positioning a spacer between two of the timber layers in the stack. The method further comprises applying pressure to the stack of timber layers and heating the stack of timber layers, such that the adhesive penetrates into the timber layers and cures to form the timber composite.

The method may be as otherwise defined above.

Also disclosed herein is a timber composite manufactured using the methods as defined above.

Further disclosed herein is a timber composite, which independently from the method in which it is manufactured, comprises at least two timber layers penetrated with a cured adhesive, wherein said cured adhesive also connects said two timber layers. In accordance with preferred embodiments of such timber composite, it may show the preferred features of the timber composite disclosed before, irrespective of the way it has been manufactured. Some important preferred features are listed here below and may be present in isolation or in combination within one and the same timber composite, namely:

the preferred feature that said two timber layers have a thickness below 1.5 mm, and preferably above 0.1 mm;

the preferred feature that said two timber layers have a thickness below 1 mm and preferably above 0.2 mm;

the preferred feature that at least one of said two timber layers is stained, and preferably both timber layers are stained;

the preferred feature that said cured adhesive is a thermosetting adhesive comprising at least one constituent chosen from the list consisting of melamineformaldehyde, ureumformaldehyde, melamine-ureumformaldehyde and phenolformaldehyde;

the preferred feature that said two timber layers are cut from one and the same piece of timber, and preferably are present in said timber composite in their original mutual order and/or mutual orientation;

the preferred feature that said timber composite has an increased density as compared to the original timber layers, wherein said increase is at least 20 percent, and even better at least 50 percent;

the preferred feature that said timber layers consist of timber layers of hardwood;

the preferred feature that said timber layers consist of timber layers having a specific gravity at 12% moisture content of at least 0.55;

the preferred feature that said timber composite comprises outer and inner timber layers in accordance with one or more of the above described seven possibilities for combining inner and outer timber layers of differing nature or quality;

the preferred feature that said timber composite has a structure of raised summer wood grain, while the spring wood is depressed;

the preferred feature that said timber layers are compressed such that their structure is free from voids.

Also disclosed herein is a timber composite comprising timber layers and an adhesive matrix. At least one surface of the timber composite has raised portions of summer wood and depressed portions of spring wood.

The invention further relates to a decorative panel comprising a substrate material and a decorative top layer, with as a characteristic that said top layer is formed by a timber composite comprising at least one timber layer penetrated with a cured adhesive.

Preferably two or more superposed timber layers are comprised in said top layer, wherein said cured adhesive connects adjacent timber layers in said top layer. It is clear that the timber composite products described above, whether or not obtained with the aforementioned method of the invention may be used as said top layer.

In a preferred embodiment of said decorative panel, said substrate material is a wood-based material, chosen from the list consisting of a MDF or HDF board, a chipboard, a Wood Plastic Composite board, a so-called lamella core, namely a board assembled from laths of e.g spruce or hevea, a thermoplastic board and a plywood board.

Preferably said decorative panel is a floor panel. It is clear that the application of a timber composite as described above in a floor panel creates large advantages. The looks of the floor panel are those of genuine parquet, while the mechanical properties of the surface are unequalled and comparable to those of laminate flooring. The decorative panel of the invention may avoid the need for sanding, even in the case the timber layers are stained.

The use of a timber composite to form the decorative surface of a floor panel, or other decorative panels, may obviate the need for finishing such panels with wear resistant coatings such as UV lacquers or oils.

Preferably said floor panel is of the type that is suitable for a floating installation.

Preferably, the decorative panel is a square or rectangular floor panel which, on at least one pair of opposite edges, and preferably at both pairs, is provided with mechanical coupling allowing to couple two of such floor panels to each other in such a manner that a locking is created in a vertical direction perpendicular to the plane of the coupled panels, as well as in a horizontal direction perpendicular to the coupled edge and in the plane of the panels.

Preferably, the coupling also shows one or a combination of two or more of the following features:

the feature that the mechanical coupling or coupling parts are substantially realized as a tongue and a groove bordered by an upper lip and a lower lip, wherein this tongue and groove substantially are responsible for the locking in said vertical direction, and wherein the tongue and the groove are provided with additional locking parts, substantially responsible for the locking in said horizontal direction. Preferably, the locking parts comprise a protrusion on the lower side of the tongue and a recess in the lowermost groove lip. Such coupling and locking parts are known, for example, from WO 97/47834; preferably the coupling, or at least said tongue and groove are realized in the substrate material;

the feature that the mechanical coupling or coupling parts press the coupled floor panels against each other, for example, in that these mechanical coupling approaches are provided with a so-called pre-tension, as known as such from EP 1 026 341. The tensioning force with which the floor panels are pressed against each other or towards each other, can be obtained, for example, in combination with the above feature by a lower lip, which is bent out in coupled position and which, when trying to spring back, presses against the lower side of the tongue;

the feature that the mechanical coupling allow a coupling by a horizontal, or quasi-horizontal shifting movement of the panels towards each other;

the feature that the mechanical coupling allows a coupling by a turning movement W along the respective edges;

the feature that the mechanical coupling allows a coupling by a downward-directed movement of a male coupling part having, for example, a tongue, up into a female coupling part having, for example, a groove;

the feature that the mechanical coupling, or at least the pertaining upper edge, is realized by a milling operation with rotating milling tools;

the feature that the mechanical coupling is for the major part realized in said substrate.

BRIEF DESCRIPTION OF THE DRAWINGS

Embodiments will now be described by way of example only, with reference to the accompanying drawings in which:

FIG. 8 in a view similar to that of FIG. 7 illustrates a variant;

FIG. 9 illustrates how the floor panel of FIG. 8 may be joint to form a floating floor covering.

DETAILED DESCRIPTION OF PREFERRED EMBODIMENTS OF THE INVENTION

Figure 1:
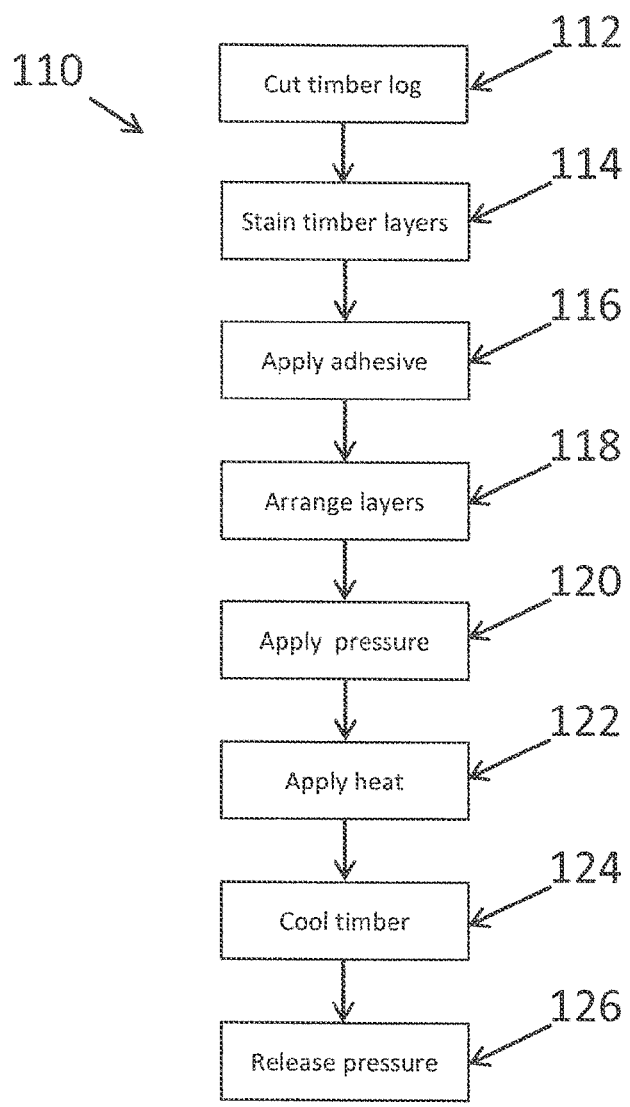
FIG. 1 is a flow chart illustrating a method of manufacturing a timber composite.

In the following detailed description, reference is made to accompanying drawings which form a part of the detailed description. The illustrative embodiments described in the detailed description, depicted in the drawings and defined in the claims, are not intended to be limiting. Other embodiments may be utilized and other changes may be made without departing from the spirit or scope of the subject matter presented. It will be readily understood that the aspects of the present disclosure, as generally described herein and illustrated in the drawings can be arranged, substituted, combined, separated and designed in a wide variety of different configurations, all of which are contemplated in this disclosure.

Referring firstly to FIG. 1, the method 110 comprises rotary cutting or slicing a timber billet into timber layers 112. Natural timber can warp due to differential shrinkage of the wood as it dries. This differential shrinkage causes internal stresses (i.e. due to tension) in the timber. When the timber is cut into thin layers, these stresses are reduced. In this case the timber layers have a thickness of 0.01-1.5 mm. After the timber is cut, the timber layers are in a natural state containing water. The water content of the timber layers can be reduced to 1%-20% by natural drying or machine drying, which can result in the produced timber composite (discussed in more detail below) having a higher density.

After the timber is cut into timber layers 112, a stain is applied to each layer 114. Applying the stain 114 to the thin layers of timber means that it more easily penetrates into and throughout the timber. In this way, the stain may be generally distributed throughout the timber. Thus, when, the timber layers are later formed into a composite timber (discussed below) the stain may be evenly distributed throughout the timber. This may not be the case with, for example, a block or panel of timber where the stain is applied to the external surface, because the stain may not be able to penetrate into the center of the block or panel of timber (this may especially be the case with hardwoods).

The method 110 further comprises applying an adhesive 116, of the type that cures at high temperatures, to the surfaces of the timber layers. The adhesive is applied by spray gun to a single surface of each of the timber layers. The adhesive may contain formaldehyde, sodium hydroxide, urea, melamine, polyvinyl alcohol, polyolefine, polyamide adhesive, polyurethane and/or asphalt.

In the illustrated embodiment the adhesive is prepared by mixing evenly 10 parts by weight of formaldehyde, 5 parts by weight of sodium hydroxide, 5 parts by weight of urea, 50 parts by weight of melamine, 5 parts by weight of polyvinyl alcohol, 5 parts by weight of polyolefine, 5 parts by weight of polyamide adhesive, 5 parts by weight of polyurethane, and 10 parts by weight of asphalt in a reaction vessel at a temperature of 80 degrees centigrade. It would be understood by a person skilled in the art that the amounts of each component and the reaction temperature can be varied without departing from the scope of the invention.

The method 110 further comprises arranging the timber layers in a stack 118. The layers are arranged so as to be in their original order in the timber billet, which ensures that the wood grain of one layer matches the grain of its adjacent layers (such that the stack retains the appearance of the original timber billet).

The method 110 further comprises applying a pressure of 0.1-30 MPa to the stack of timber layers 120 and heating the stack 122 to a temperature between 50° C. and 250° C. and typically 100° C. to 200° C. The stack is gradually heated from room temperature to this temperature over a period of between 3 minutes and 20 minutes. In other embodiments, the temperature may be increased at a faster or slower rate (i.e. over a shorter or longer period of time).

The heat 122 and pressure 120 causes the adhesive to penetrate into and throughout the fibers of the timber layers including into the interstices and pores between fibers. The gradual heating of the adhesive provides the adhesive with time to penetrate into the timber. Once the adhesive cures it holds the timber in shape (i.e. the shape it takes when compressed or pressurized), such that upon release of the pressure it does not return (e.g. bounce back) to its original shape. Thus, the density of the timber composite is higher than the density of the original timber billet (i.e. the non-composite timber). The timber layers are bonded to one another by the curing of the adhesive and form a single piece of high density composite timber. The timber is then allowed to cool and the pressure is released.

Figure 2:
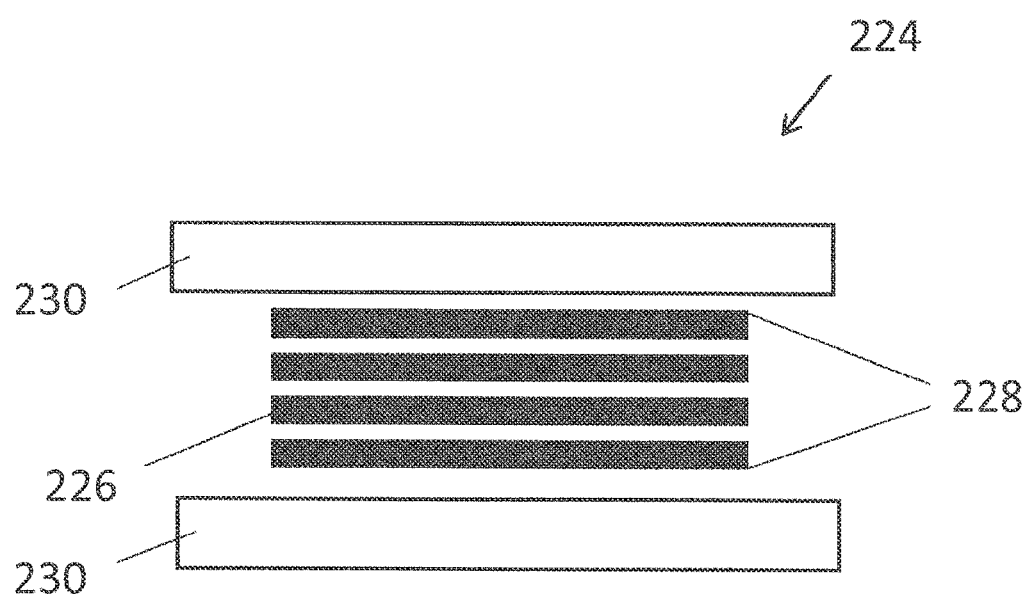
FIG. 2 schematically illustrates an apparatus for manufacturing a timber composite.

FIG. 2 schematically illustrates an apparatus 224 used to manufacture a composite wood board, for example, according to the method shown in FIG. 1 and described above.

As illustrated, four sheets of timber 226 are stacked on top of one another to form a stack of timber layers 228. Each timber layer 226 has been coated with adhesive by way of spray gun, and has a thickness of 1.5 mm and a water content of 1%. The stack of timber layers 228 is positioned between two steel plates 230 which, in use, apply a pressure of 1-20 MPa to the stack of timber layers 228. Additionally, each steel plate 230 can be gradually heated from room temperature to 100-200° C. over a period of 3-20 minutes, which in turn heats the stack of timber layers 228. The heat can be transferred directly from the steel plates 230 to the stack of timber layers 228. This allows the adhesive to penetrate the fibers of the timber and cure, so as to bond the timber layers 226 to one another. The bonding of the timber layers 226 forms a high density composite timber. The pressure applied by the steel plates 230 is then released and the timber composite is allowed to cool.

Figure 3:
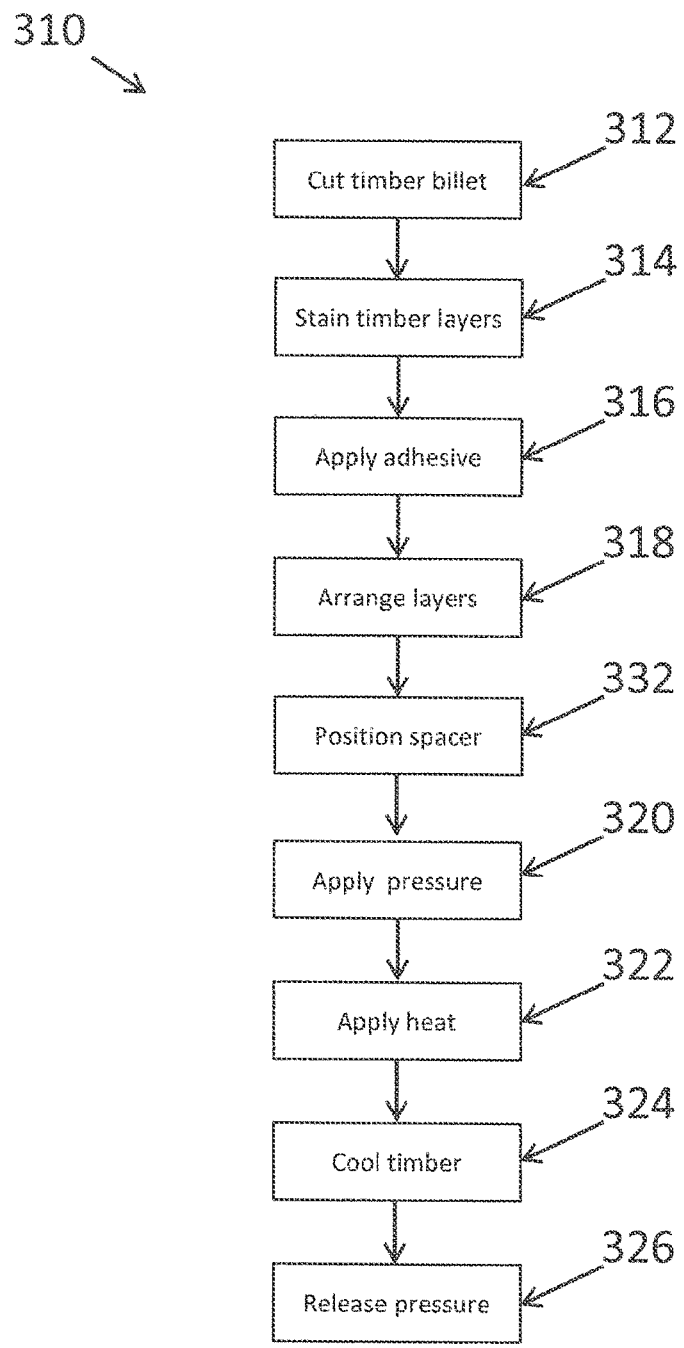
FIG. 3 is a flow chart illustrating a further method of manufacturing a timber composite.

Referring now to FIG. 3 the method 310 is similar to that shown in FIG. 1 and described above, but includes some differences. For example, the method 310 further comprises the step of positioning a spacer 332 between two timber layers in the stack. The spacer may be a sheet of cardboard, plastic or soft metal. As set forth above, when the stack of timber layers is pressurized (i.e. compressed) 320 and heated 322, the adhesive permeates (or penetrates) into the fibers of the timber and cures. Additionally, the moisture in the timber tends to move towards the center of the stack of timber layers (due to heat being transferred at external surfaces of the stack). When a spacer is positioned between two of the layers it prevents passage of moisture between the layers (i.e. the moisture is essentially trapped by the spacer). As the temperature increase 322 the moisture forms steam, which softens the timber layers located either side of the spacer. The spring wood in the timber layers shrinks to a greater extent than the summer wood in the timber layers. When the adhesive cures (as discussed above), it generally holds the timber in its compressed shape, with the spring wood having shrunk to a greater extent than the summer wood. Upon release of the pressure, the timber generally does not return, e.g. bounce back, to its original shape. The summer wood however, due to its greater density, may minimally return to its natural state, whilst the spring wood in the timber does not return (e.g. bounce back). Hence, the resultant timber has raised portions of summer wood and depressed portions of spring wood. This produces an embossed appearance that accentuates the grain structure of the timber. Due to the depth of the grain, this embossed, wood grain, appearance can remain even after polishing the timber composite.

When the timber layers are cut 312 from a single piece of timber (e.g. billet—as is the case in this embodiment), the timber layers can be stacked 318 in the same order and orientation as they were in before the billet was cut (i.e. so as to essentially re-form the original piece of timber). By doing so, the produced timber composite will have the same (or similar) natural wood grain of the original timber piece and having a wire-drawing and embossed effect.

Figure 4:
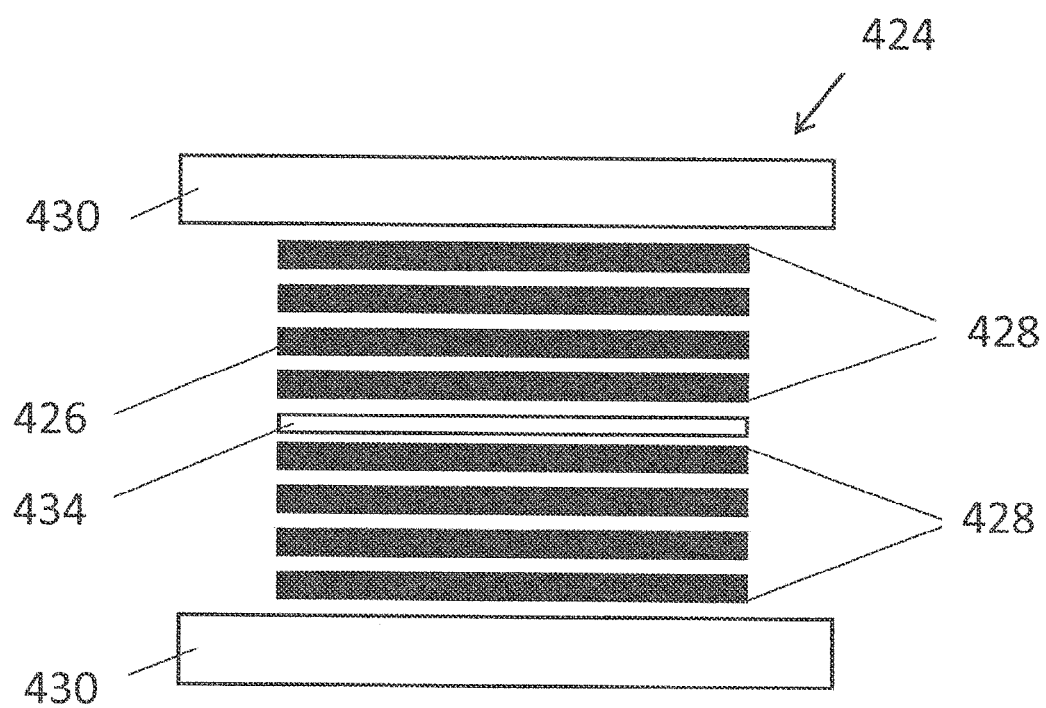
FIG. 4 schematically illustrates a further apparatus for manufacturing a timber composite.

FIG. 4 schematically illustrates an apparatus 424 for simultaneously pressing multiple composite timber boards 426 according to, for example, the method 310 shown in FIG. 3 and described above.

Two stacks 428 of timber layers 426, each consisting of timber layers 426 of 1.2 mm thickness, are positioned adjacent to one another (i.e. one on top of the other). A spacer in the form of a plastic sheet 434 is positioned between the adjacent stacks of timber layers 428. In the illustrated embodiment each timber layer 426 has a water content of 20%. The apparatus 424 comprises two steel plates 430, which the stacks of timber layers 428 are positioned between. The steel plates 430 are capable of applying pressure of 1-20 MPa to the stacked wood slice assemblies 428. Whilst not shown, the apparatus 424 comprises a heater also capable of directly heating the two steel plates to 100-200° C., over a period of 3-20 minutes. In use, this heat is transferred from the steel plates 430 to the timber layers 426. Two or more composite timber boards are produced after the release of the pressure and then the removal of the plastic sheet spacer 434. In this respect, the apparatus 424 allows more than one composite timber board to be produced in one pressing and heating operation. Thus apparatus 424 may provide an efficient way to produce multiple timber composite boards, which may in turn provide energy savings. Further, and as set forth above with regards to the method 310 shown in FIG. 3, the apparatus 424 may allow the production or manufacture of timber composite having an embossed (i.e. raised grain) appearance.

In the illustrated embodiment, two stacks of timber layers 428 are shown, each having four timber layers 426. In alternative embodiments, there may be three, four, five, etc. stacks of timber layers (having spacers therebetween) each having one, two, three, five, six, etc. timber layers. In such embodiments, any timber composite produced from stacks located between two spacers would have an embossed appearance on both (e.g. upper and lower) sides. It would be understood by a person skilled in the art that the number and the thickness of the timber layers in each stack of timber layers can be varied to vary qualities of the timber composite that is produced by the apparatus.

Figure 5:
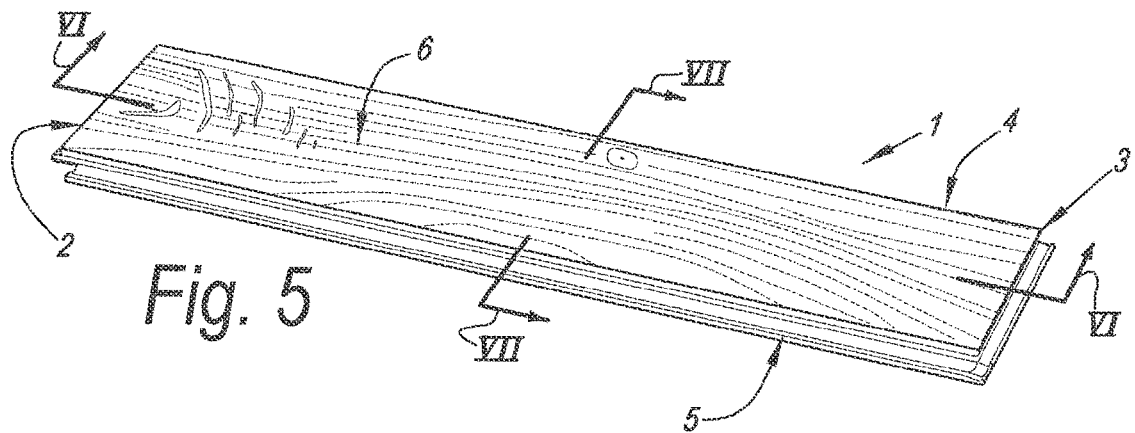
FIG. 5 shows a perspective view of a decorative panel in accordance with the invention.

FIG. 5 illustrates a decorative panel, more particularly a floor panel 1, in accordance with the invention. The panel 1 is rectangular and oblong and comprises a pair of opposite short edges 2-3 and a pair of opposite long edges 4-5. The decorative upper surface 6 is formed by a timber composite 7.

Figure 6:
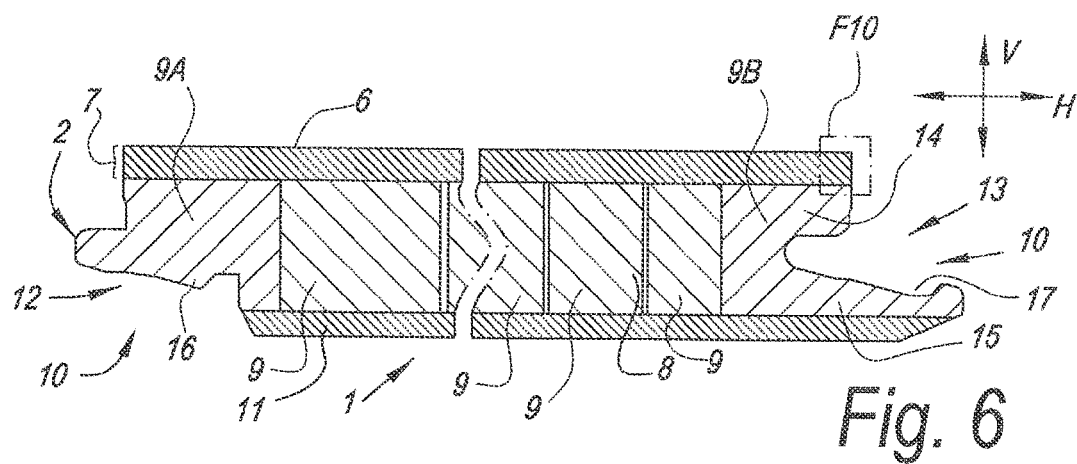
FIGS. 6 and 7 are cross-sections at a larger scale according to the line VI-VI and VII-VII respectively in FIG. 5.

FIG. 6 clearly shows that the decorative panel 1 comprises a substrate material 8 upon which the timber composite 7 is provided, e.g. glued or otherwise connected. The substrate material 8 in this case consists of a so-called lamella core, which comprises a plurality of adjacent laths 9 oriented cross wise over the length of the floor panel 1. Preferably such laths are made from softwood, e.g. spruce or hevea. The outermost laths 9A-9B that form the short edges 2-3 may be made from a different material, such as from MDF/HDF or plywood. Such material allows for a better processing, for e.g. milling to form the mechanical coupling parts 10 therein. At the bottom of the substrate material 8 a backing layer 11 is provided, e.g. glued or otherwise attached against the lamella core. Such backing layers is preferably made from a wood veneer having a thickness of at least 50 percent of said timber composite 7 forming the upper surface 6. According to a variant a timber composite 7 may be used for the backing layer 11 as well.

Figure 7:
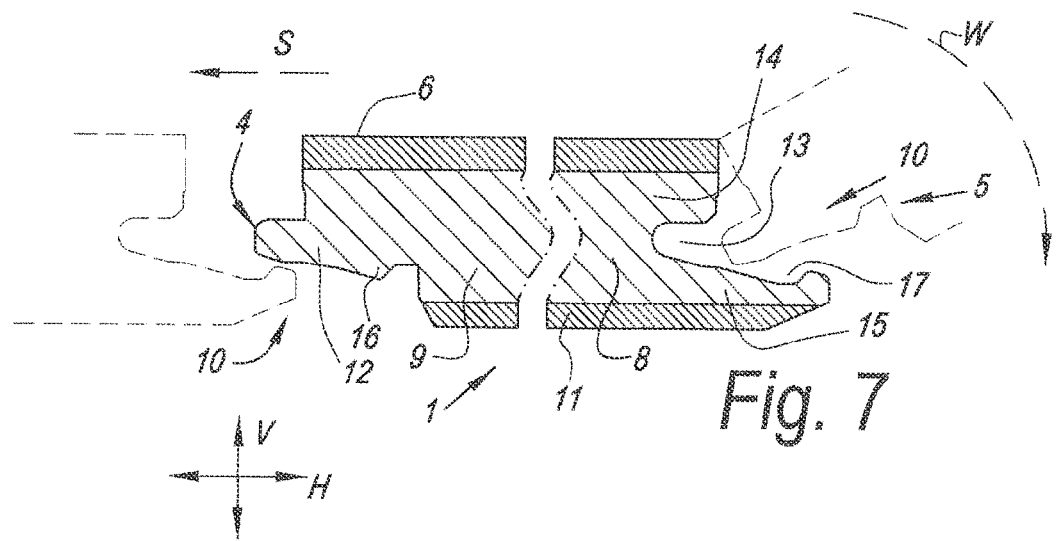

FIGS. 6 and 7 illustrate that both pairs of opposite edges 2-3-4-5 are provided with mechanical coupling 10 that is substantially realized as a tongue 12 and a groove 13 bordered by an upper lip 14 and a lower lip 15, wherein this tongue 12 and groove 13 substantially are responsible for the locking in a vertical direction V, and wherein the tongue 12 and the groove 13 are provided with additional locking parts 16-17, substantially responsible for the locking in a horizontal direction H. Preferably, the locking parts comprise a protrusion 16 on the lower side of the tongue 12 and a recess 17 in the lowermost groove lip 15. The coupling parts 10 illustrated in FIGS. 6 and 7 at least allow a coupling by a turning movement W along the respective edges 2-3-4-5 and/or a coupling by a shifting movement S in a substantially horizontal fashion of the edges 2-3-4-5 to be coupled towards each other.

FIGS. 8 and 9 illustrate a variant with a short pair of edges 2-3 that allow a coupling at least by a downward-directed movement D. One edge 2 is provided with a male coupling part 18, while the other edge 3 of this short pair 2-3 is provided with a female coupling part 19. By the downward movement D the male coupling part 18 is pushed into the female coupling part 19 to become locked in the vertical direction V due to a pair of cooperating heels 20 and recesses 21. In this case the recess 21 is partly formed by a resilient element 22 arranged in the female coupling part 19.

Figure 10:
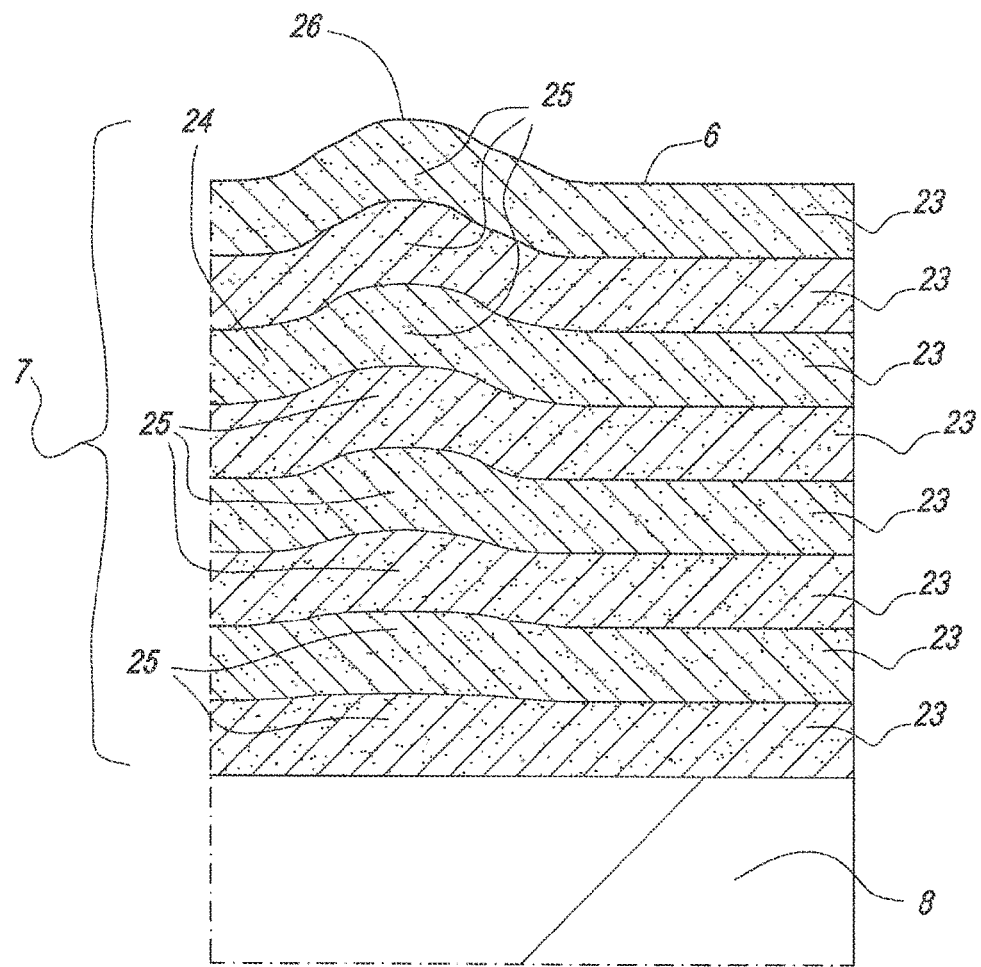
FIG. 10 at a larger scale illustrates the area indicated with F10 on FIG. 6.

FIG. 10 gives a detailed view on the composite structure of the timber composite 7 that forms the upper decorative surface 6. The timber composite 7 is formed by a plurality of superposed timber layers 23 that are penetrated with cured adhesive 24. Further the timber composite 7 shows an embossed effect at the decorative upper surface 6, wherein the summer wood 25 shows up as a raised portion 26.

FIG. 10 clearly illustrates that the plurality of timber layers 23 have been assembled or laminated on top of each other such that the summer wood 25 of the plurality of timber layers is substantially vertically aligned. The order and orientation of the timber layers 23 has been maintained as compared to the order in which they were cut from a timber billet.

Some embodiments of the invention have been described above, but the invention may be embodied in many other forms. Modifications and improvements can be made by a person skilled in the art without departing from the essence of the present invention. Such modifications and improvements fall within the scope of the present invention.

For example, the spacer can alternatively be paper or card board, plastic film, soft metal (e.g., aluminum or copper) etc. Alternatively, the spacer may be formed from a combination of these materials.

Further, the timber layer may have a thickness of 0.01 to 100 mm. Alternatively, the timber layer may have a thickness between 0.1 to 5 mm or 1 to 3 mm. In case the timber composite is used as the top layer in a decorative flooring panel, the thickness is preferably at least about 2.5 mm and may range up to 3.5 or 4 mm. To reach such thickness it is clear that the timber composite should preferably comprise two or more timber layers. It is not excluded that a timber composite forming the upper surface of the decorative flooring panel would only comprise one timber layer penetrated with cured adhesive. Such floor panel presents important advantages over floor panels for veneer parquet.

The timber composite produced from the methods and apparatus set forth above may have a higher density if the thickness of the wood slices is alternatively between 0.2 to 1 mm. Additionally, the cutting method can be rotary peel, slicing or saw cutting.

The moisture content of the timber layers may be 1% to 60%. Alternatively the moisture content may be 5% to 30%. Alternatively the moisture content may be 8% to 12%.

The pressure applied to the timber layers or stacks may be 0.01 MPa to 30 MPa. Alternatively the pressure may be 0.05 MPa to 20 MPa. Alternatively the pressure may be 2 MPa to 10 MPa.

The maximum temperature applied to the timber layers or stacks may be 10° C. to 400° C. Alternatively the temperature may be 50° C. to 300° C. Alternatively the temperature may be 100° C. to 200° C.

As discussed above, the number of timber layers in each stack can be varied as needed. For example, there may be one, two, three, four, five, etc. layers in each stack of timber layers. Additionally, each stack of timber layers does not have to have the same number of timber layers as other stacks.

Multiple spacers can be used between stacks of timber layers. For example, when there are three stacks of timber layers, two spacers may be positioned between the stacks.

The surfaces of the timber layers can be coated with adhesive by, for example, using one or more of the following methods:
1. The adhesive can be sprayed to a surface of a timber layer by using a spray gun so that the adhesive can be applied to the surface of the timber layer evenly.
2. The adhesive can be applied to a surface of a timber layer by using a coating roller, so that the adhesive can be applied to the surface of the timber layer evenly.
3. The timber layer can be dipped into adhesive so that the fibers in the timber layer can naturally absorb the adhesive, thus coating the surface of the timber layer with adhesive.
4. Providing the adhesive in a sealable container, dipping a timber layer into the adhesive, sealing the container, pressurizing the interior of the container. This may force the adhesive to permeate into the wood fibers of the timber layer more sufficiently under pressure.
5. Applying adhesive to both sides of a carrier, and placing the carrier between two wood slices so that the adhesive can permeate into the wood fibers of the wood slices 1 sufficiently. The carrier can be, for example, paper or nonwoven cloth.

EXAMPLES

Example 1

Six timber layers of 0.6 mm thickness were sliced from a timber billet. The timber layers were kiln dried in order to reduce their moisture content to approximately 10%. Adhesive was then sprayed on to both sides of the timber layers. Following this, the timber layers were again kiln dried to a moisture content of approximately 10%.

The six timber layers were then arranged in a stack according to the order they were sliced from the timber billet. This stack was placed into a pressing machine, which was used to apply 7 MPa of pressure to the stack. The temperature was increased from 20° C. to 200° C. over a 60 minute period and then held at 200° C. for 20 minutes. Following this, the temperature was decreased from 200° C. to 20° C. over a period of 45 minutes.

The pressure was then released from the stack of timber layers, which were formed into a timber composite board having smooth upper and lower surfaces.

Example 2

Twelve timber layers of 0.6 mm thickness were sliced from a timber billet. The timber layers were kiln dried in order to reduce their moisture content to approximately 10%. Adhesive was then sprayed on to both sides of the timber layers. Following this, the timber layers were again kiln dried to a moisture content of approximately 10%.

The twelve timber layers were then arranged in two stacks, each stack having six timber layers stacked according to the order they were sliced from the timber billet. The stacks were placed into a pressing machine and a plastic film spacer was placed between the two stacks of timber layers. Using the press, a pressure of 7 MPa was applied to the stacks. The temperature was increased from 20° C. to 200° C. over a 60 minute period, and then held at 200° C. for 20 minutes. Following this, the temperature was reduced from 200° C. to 20° C. over a period of 45 minutes.

The pressure was then released from the stacks of timber layers and the plastic film was removed. Each stack was formed into a timber composite board having one surface with a raised grain or embossed appearance.

Example 3

The timber was sliced into a series of 0.5 mm thick veneer. The veneer was dried so as to reduce the veneer moisture content to 12% by weight.

Formaldehyde melamine adhesive (200 g/m$^2$) was sprayed onto the veneer, then the veneer was dried again to a moisture content of 12% by weight.

The veneer was then stacked according to the original order of slicing.

Pressure (95 kg/cm$^2$) then heat ware applied to the stack. The temperature was raised from room temperature to 180° C. When the adhesive in the stack was fully cured, the temperature was reduced back to room temperature.

Example 4

The timber was sliced into a series of 0.5 mm thick veneer. The veneer was dried so as to reduce the veneer moisture content to 12% by weight.

Formaldehyde melamine adhesive (200 g/m²) was sprayed onto the veneer, then the veneer was dried again to a moisture content of 12% by weight.

The veneer was then stacked in two separate stacks according the original order of slicing. The two stacks were separated by a plastic film. Use of plastic film allowed an embossed look to be achieved.

Pressure (95 kg/cm²), then heat, were applied to the stack. The temperature was raised from room temperature to 180° C. When the adhesive in the stack was fully cured, the temperature was reduced back to room temperature.

In the claims which follow, and in the preceding description, except where the context requires otherwise due to express language or necessary implication, the word "comprise" and variations such as "comprises" or "comprising" are used in an inclusive sense, i.e. to specify the presence of the stated features but not to preclude the presence or addition of further features in various embodiments of the methods or timber composite as disclosed herein.

The invention claimed is:

1. A decorative panel comprising a substrate material and a decorative top layer, wherein the decorative top layer comprises at least one timber layer with a wood structure, wherein the timber layer is a compressed timber layer with naturally occurring vessels throughout a thickness of the wood structure, the vessels being collapsed.

2. The decorative panel of claim 1, wherein the timber layer has a permanent increased density as compared to an original timber layer.

3. The decorative panel of claim 2, wherein the timber layer has an increased density of at least 20 percent or at least 50 percent.

4. The decorative panel of claim 1, wherein the substrate material is a wood-based material, selected from the group consisting of a MDF or HDF board, a chipboard, a Wood Plastic Composite board, a lamella core, a board assembled from laths, a thermoplastic board and a plywood board.

5. The decorative panel of claim 1, wherein the decorative panel comprises a glue layer between the decorative top layer and the substrate material to attach the decorative top layer to the substrate material.

6. The decorative panel of claim 5, wherein the glue layer comprises an adhesive or a thermosetting adhesive.

7. The decorative panel of claim 1, wherein the decorative top layer comprises a wear resistant coating or a wear resistant coating that is a UV lacquer or oil.

8. The decorative panel of claim 1, wherein the decorative panel is a square or rectangular floor panel which, at, at least one pair of opposite edges, or at both pairs, comprises mechanical coupling allowing to couple two of such floor panels to each other such that a locking is created in a vertical direction perpendicular to a plane of the coupled panels, as well as in a horizontal direction perpendicular to the coupled edge and in the plane of the coupled panels, the mechanical coupling being in the substrate material.

9. The decorative panel of claim 1, wherein the timber layer comprises a wood grain comprising both summer wood grain and spring wood grain, wherein the timber layer comprises raised portions and depressed portions, wherein the raised portions correspond to the summer wood grain and the depressed portions correspond to the spring wood grain.

10. The decorative panel of claim 1, wherein the wood structure is free from voids.

11. The decorative panel of claim 1, wherein the timber layer has a thickness of below 1.5 mm, or a thickness of below 1 mm and above 0.2 mm.

12. The decorative panel of claim 1, wherein the timber layer is a stained timber layer.

* * * * *